United States Patent
Wein

(10) Patent No.: US 10,104,747 B1
(45) Date of Patent: Oct. 16, 2018

(54) ENTRANCE TICKET WITH LIGHTING EFFECT

(71) Applicant: Michael Wein, Houston, TX (US)

(72) Inventor: Michael Wein, Houston, TX (US)

( * ) Notice: Subject to any disclaimer, the term of this patent is extended or adjusted under 35 U.S.C. 154(b) by 0 days.

(21) Appl. No.: 15/950,052

(22) Filed: Apr. 10, 2018

Related U.S. Application Data

(63) Continuation-in-part of application No. 15/339,913, filed on Oct. 31, 2016, now Pat. No. 9,942,968, which is a continuation of application No. 14/797,918, filed on Jul. 13, 2015, now Pat. No. 9,485,841, which is a continuation of application No. 13/366,243, filed on Feb. 3, 2012, now Pat. No. 9,111,184, which is a continuation-in-part of application No. PCT/US2010/043839, filed on Jul. 30, 2010, which is a continuation of application No. 12/534,813, filed on Aug. 3, 2009, now Pat. No. 8,006,899.

(51) Int. Cl.
| | |
|---|---|
| *H05B 37/02* | (2006.01) |
| *F21V 33/00* | (2006.01) |
| *F21L 4/08* | (2006.01) |
| *G09F 3/00* | (2006.01) |
| *F21L 4/02* | (2006.01) |
| *G06K 19/04* | (2006.01) |
| *A63H 37/00* | (2006.01) |
| *F21W 121/06* | (2006.01) |

(52) U.S. Cl.
CPC ......... *H05B 37/0236* (2013.01); *A63H 37/00* (2013.01); *F21L 4/02* (2013.01); *F21L 4/08* (2013.01); *F21V 33/00* (2013.01); *F21V 33/008* (2013.01); *G06K 19/04* (2013.01); *G09F 3/0297* (2013.01); *H05B 37/029* (2013.01); *H05B 37/0272* (2013.01); *F21W 2121/06* (2013.01)

(58) Field of Classification Search
CPC .... G08C 17/02; G08C 23/04; G08C 2201/20; G08C 2201/92; G08C 19/28; G08C 2201/30; G08C 2201/21; G08C 17/00
USPC ........................................................ 340/4.3
See application file for complete search history.

(56) References Cited

U.S. PATENT DOCUMENTS

| | | | |
|---|---|---|---|
| 6,965,205 B2 | 11/2005 | Piegras et al. | |
| 7,011,435 B1 * | 3/2006 | Blaymore | F21V 21/15 362/371 |
| 7,614,771 B2 * | 11/2009 | McKechnie | G09F 9/33 315/307 |
| 2011/0058363 A1 | 3/2011 | Fattizzi | |
| 2012/0253974 A1 | 10/2012 | Haikonen et al. | |
| 2014/0184386 A1 | 7/2014 | Regler et al. | |

\* cited by examiner

*Primary Examiner* — Mark Blouin
(74) *Attorney, Agent, or Firm* — Rao DeBoer Osterrieder, PLLC; Dileep P. Rao

(57) ABSTRACT

A method for creating a desired lighting effect. The desired lighting effect is created by using a plurality of apparatuses at a controlled access venue which are capable of actuating one or more lights. The apparatuses in conjunction can create a desired lighting affect. The desired lighting effect can be customized to alleviate crowds. The desired lighting effect can also help to identify and direct aid to attendees in distress.

6 Claims, 5 Drawing Sheets

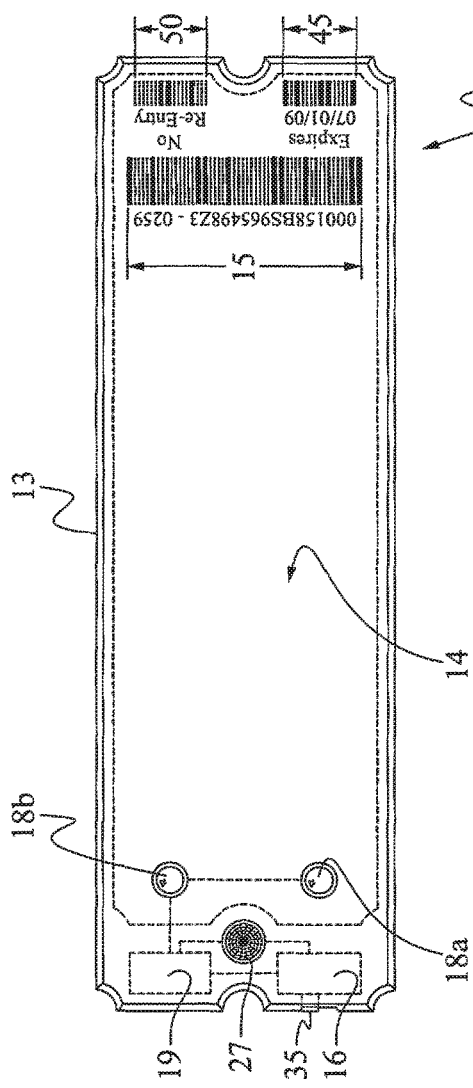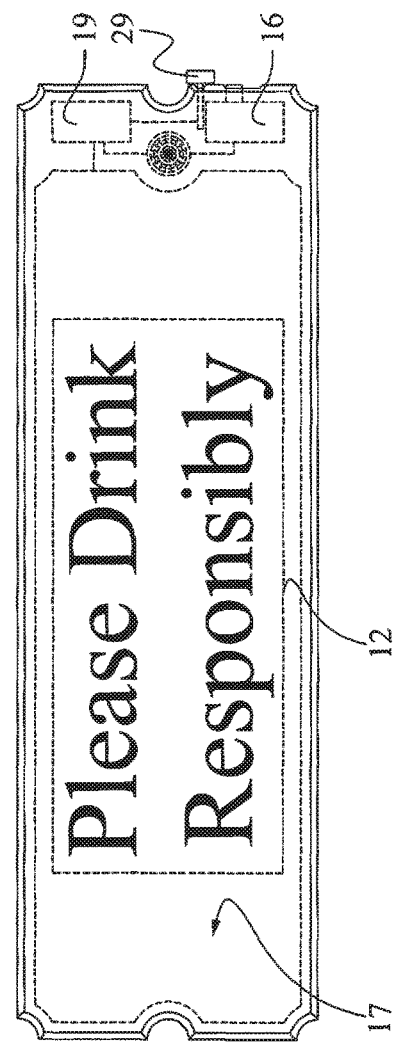
FIGURE 2
FIGURE 3

ENTRANCE TICKET WITH LIGHTING EFFECT

CROSS REFERENCE TO RELATED APPLICATIONS

The present application is a Continuation in Part of U.S. patent application Ser. No. 15/339,913, filed on Oct. 31, 2016, titled "ENTRANCE TICKET WITH LIGHTING EFFECT," now issued as U.S. Pat. No. 9,942,968 on Apr. 10, 2018, which is a Continuation of U.S. patent application Ser. No. 14/797,918, filed on Jul. 13, 2015, titled "ENTRANCE TICKET WITH LIGHTING EFFECT," now issued as U.S. Pat. No. 9,485,841 on Nov. 1, 2016, which is a Continuation of U.S. patent application Ser. No. 13/366,243, filed on Feb. 3, 2012, titled "ENTRANCE TICKET WITH LIGHTING EFFECT," now issued as U.S. Pat. No. 9,111,184 on Aug. 18, 2015, which is a Continuation in Part of International Application No. PCT/US2010/043839, filed on Jul. 30, 2010, titled "ENTRANCE TICKET WITH LIGHTING EFFECT," which is a Continuation of U.S. patent application Ser. No. 12/534,813 filed on Aug. 3, 2009 titled, "ENTRANCE TICKET WITH LIGHTING EFFECT," now issued as U.S. Pat. No. 8,006,899 on Aug. 30, 2011. These references are hereby incorporated in their entirety.

FIELD

The present embodiments generally relate to an apparatus and a method of use of an apparatus that operates to provide admission to a venue and to create a lighting effect synchronized with other audience members, enabling the holder to gain admission to the venue and to participate with a performance at the venue.

BACKGROUND

A need exists for an apparatus that can provide for tracking of admissions, controlling access of admissions, as well as enabling an attendee to interact with a performance at a venue, thereby enabling the attendee to more fully become involved in the event. A need exists for a method of using a dual-purpose apparatus that can provide for tracking of admissions, controlling access of admissions, as well as enabling an apparatus holder to interact with a performance at a venue, thereby enabling the apparatus holder to more fully become involved in a performance.

The present disclosure cures the above deficiencies.

BRIEF DESCRIPTION OF THE DRAWINGS

The detailed description will be better understood in conjunction with the accompanying drawings as follows:

FIG. 2 shows a front view of the apparatus according to one or more embodiments.

FIG. 3 shows a back view of the apparatus according to one or more embodiments.

Figure 1A:
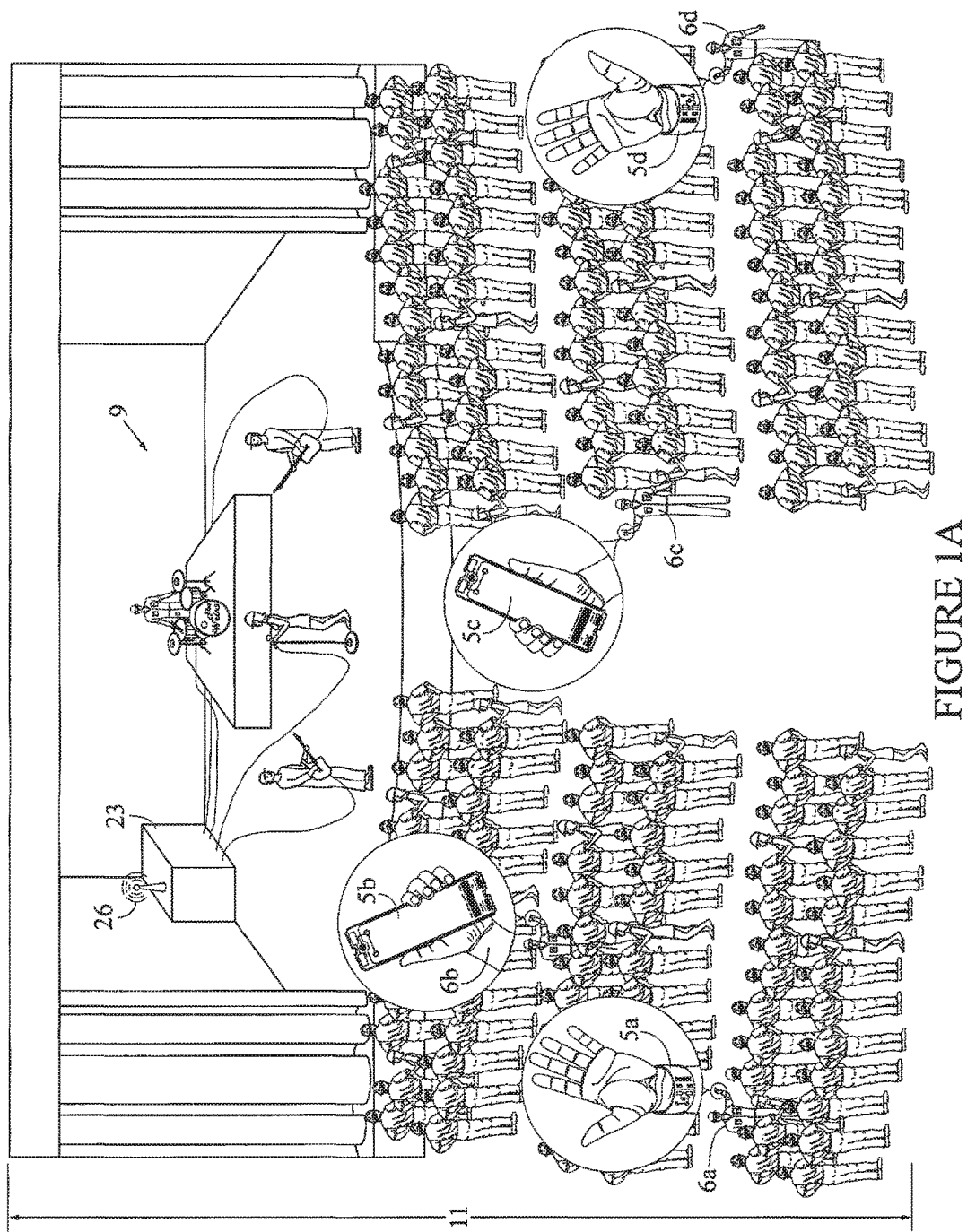
FIG. 1A shows a diagram of a venue with the apparatus for the lighting effect contained in it.

The embodiments of the present disclosure are detailed below with reference to the listed Figures.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to an apparatus and method for creating a desired lighting effect in a venue. Each attendee of a plurality of attendees can be provided an apparatus. The plurality of apparatus can act in a coordinated fashion to create a desired lighting effect.

The method can include providing an apparatus for creating a lighting effect in a venue. The apparatus can include a substrate. The substrate can be any material. The apparatus can have a power source in communication with the substrate.

At one light emitting device can be configured to provide a lighting effect. The lighting effect can be a steady glow at a fixed intensity, a variably intensity, a flicker on and off, a change of colors, a smooth flow, or other predetermined lighting effect.

Accordingly, the method can include causing manipulation of the light emitting device to create the lighting effect. The manipulation of the light emitting device can be caused by any telemetry interacting with a processor configured to control the light emitting device. The manipulation of the light emitting device can cause the lighting effect. For example, a signal can be sent to a processor in communication with the light emitting device to cause the light emitting device to alternate between a first color and a second color. In illustration, the signal can interact with the processor causing manipulation of the light emitting device to produce an image. The manipulation of the light emitting device can cause any desired lighting effect.

In one or more embodiments, causing the manipulation of the lighting effect can be accomplished by configuring a processor in communication with the light emitting device to manipulate the light emitting device to provide a predetermined lighting effect in accordance with a specific instrument being played. For example, the processor can manipulate the light emitting device to provide a lighting effect of a flashing light that flashes in correlation to beats of a drum.

In one or more embodiments, the method can include providing a first set of apparatus to a first set of attendees, and providing a second set of apparatus to a second set of attendees. The method can also include manipulating the lighting effect of the first set of apparatus according to sound emitted from a first instrument, and manipulating the lighting effect of the second set of apparatus according to sound emitted from a second instrument.

The apparatus can be an item passed out at the venue, a ticket to the venue, exchanged for a ticket to the venue, or the like.

In one or more embodiments, the light emitting device can be a sticker passed out at the venue that can be attached to a substrate that was provided with the ticket and configured to connect with the power source in the substrate.

In one or more embodiments, the power supply can be a sticker passed out at the venue and configured to connect with a light emitting device on the substrate. The substrate can be the ticket.

The apparatus can create a synchronously presented lighting effect from an audience in a venue, such as a controlled access venue, such as a music theater or a concert hall, during a performance.

Each of the plurality of apparatus can have a substrate with a first side for supporting a readable identification code and a second side for supporting a message such as "don't smoke" or "danger high decibels expected." In embodiments, the substrate can have a thickness less than about 0.4 inches, can weigh less than about 2 ounces, and can be flexible.

A unique identification code can be used with each apparatus, which can be a bar code, a numerical code, an alphanumeric code, a radio frequency identification "RFID" tag, or a series of "check digits" used to verify a code, which are known in the warehouse packing industry.

A power source can be disposed on or embedded within the substrate, such as a small camera battery or other battery. The power source can be from about 1 volt to about 9 volts and can originate from a battery, such as a hearing aid battery, a printable battery, a watch battery, a lithium ion battery, a rechargeable battery, a solar battery, or any other commercially available battery.

Any number of light emitting devices can be electrically connected to the power source for use during the performance. The at least one light emitting device can be anything capable of emitting light. For example, the at least one light emitting device can be a light emitting diode "LED", an organic light-emitting diode "OLED", a luminescent material, a paint or a coating, and the like. The light emitting device can have a plurality of pixels, lines, or be of varying intensity.

A controller with a processor, and a data storage can be disposed in the substrate. The processor can be in communication with the data storage and can further be in electrical communication with the power source and the at least one light emitting device.

Computer instructions can be stored in the data storage, which can be used to instruct the processor to operate the lights in a predetermined sequence. The processor can be activated by a musical beat, by a melody, by a pitch line, or the processor can activate as a reaction to the performance on the stage of the venue. In embodiments, the data storage can be flash memory. In embodiments, the processor can be a microprocessor.

The apparatus can have an actuator associated with the substrate which can be, in an embodiment, embedded in the substrate for initiating flashing of the lights based on a predetermined set of computer instructions which determine how the lights flash, including the sequence of the flashing.

The actuator can be in direct communication with the processor. The actuator can be a sound receiver which can receive a sound from the stage or a signal from a performance transmitter and can then initiate the lighting effect. The signal from the performance transmitter can be referred to herein as a first signal. In embodiments, the actuator can also affect scents, induce vibration, or otherwise engage other senses of the attendee in addition to the visual light actuation.

The sound receiver can be a microphone or any other commercially available sound receiver.

The apparatus can have an actuator that is a pull tab, which can be disposed at least partially in the substrate acting as a separator between the power source and the processor, so that when the pull tab is removed a connection between the processor and the power source is formed such that the processor can receive power and can utilize the computer instructions on the data storage which determines the sequence of the lighting effect.

In operation, the pull tab can be torn off the substrate, thereby establishing a circuit between the power source and the processor and sending a signal to initiate the processor. The pull tab can initially be disposed between the power source and the processor, thereby disrupting any electronic signal from communicating between the power source and the processor. Upon removal of the pull tab from the substrate, the pull tab will no longer be disrupting any electronic signal between the power source and processor, allowing the processor to be initiated.

In an embodiment, the pull tab can be disposed on a tear tab, such as a perforated ticket stub. The tear tab can be removed from the apparatus or substrate by tearing the tear tab from the apparatus or substrate along the perforation. As the tear tab is removed from the substrate, the pull tab is simultaneously removed from the substrate, thereby establishing electrical communication between the power source and the processor. In this manner, the tear tab cannot be reattached to the substrate, thereby ensuring that the apparatus is only usable for one performance.

In an embodiment, the actuator can initiate the processor when it receives a second signal from a network transmitter connected to a network to start the lighting sequence or to change a lighting sequence that has been started.

Alternatively, a switch, such as an electronic on/off switch, can be embedded in the substrate or attached to the surface of the substrate. The switch can mechanically initiate the light individually or can initiate the flashing light sequence.

Combinations of actuators can be usable with the apparatus.

The processor of each apparatus can operate synchronously to create a lighting effect such as three short flashing lights, followed by two long flashing lights, followed by three short light flashes to interact and send a message with music being performed on stage. Another part of the same audience can have different computer instructions, which flash those lights in a counterpoint beat to the first group of audience members. Similarly, there can be a third group of audience members, which can be all with green lights, that flash as a group in between the other flashing lights which can be red or blue. Additional colors or multicolored lights can be usable with the embodiments.

Simultaneously the processors for the plurality of apparatus can synchronously operate during the performance all the while serving the dual purpose of controlling access to the venue. These unique apparatuses can allow each holder to interactively participate with the performance as a member of the performance with the apparatus.

The apparatus can in an embodiment have a flexible substrate, which can be reusable. In an embodiment, the flexible substrate can have a thickness of less than about 1 inch, and a weight of less than about 5 ounces.

The first signal can be an audio signal or a wireless signal. In an embodiment, the audio signal can have a preset frequency limit that represents a bass frequency range, a treble frequency range, a sequence of pitches, or a drum beat sequence to initiate the actuator on each of the plurality of apparatus.

In embodiments, the audio signal and the wireless signal can come from the network, which can be initiated at a predetermined time.

In an embodiment, the auto signal and the wireless signal can be generated by a user, such as by a disc jockey "DJ," an operator, a sound technician, or similar user, by tapping a beat using a mouse, an IPOD™, an IPHONE™, or another similar device, which can be in communication with the network, such as with a computer, a laptop, a tablet computer, a personal digital assistant, a cellular phone, or combinations thereof.

The apparatus can additionally have an expiration date programmed into the computer instructions in the data storage for deactivating the processor, so that an apparatus used for the Beach Boys in New Jersey, on June $22^{nd}$ cannot be used again to see the Beach Boys in Chicago on June $23^{rd}$.

In embodiments, the light or light emitting device can be a light emitting diode (LED), a fluorescent light, a halogen light, a neon light, or combinations thereof.

In embodiments, an electroluminescence coating can be printed on the substrate and can also act as the lighting effect, replacing the light for some uses, and acting in conjunction to the light in other uses. In addition, electroluminescent wire can be used, which can also act as the lighting effect.

If lights are used, the lights can be connected together on the apparatus in series, in parallel, or combinations thereof, to the power source.

In embodiments, the substrate can also include a lighter and the actuator can be a removable pin, which when the pin is removed from the lighter, it can allow the sequence of lights to electrically engage the power source and initiate.

In embodiments, the lighter can have a case, which can be 100 percent engulfed with electroluminescence, electroluminescent wires, or chemiluminescence paint or a similar coating that appears to glow independently without the need for any additional stimulating light. An embodiment can be contemplated for use with black lights.

In an embodiment, the apparatus can be imprinted and a "smart" lighter with a removable pin for engaging the lighter, such as a magnet pin that can be detachable at the venue with a security controllable pin removing device.

In this embodiment, the lighter can also include a microprocessor and data storage, which can also have computer instructions for producing a lighting effect as described previously.

In an embodiment, the removable pin can be removable by a security guard, that the removable pin can in fact be a security controllable pin that can require a security controllable pin removing device that is only used at an entrance to the venue.

In embodiments, the substrate of the apparatus can be one or more of the following types of items, but is not limited to: a stiff paper, a non-forming flexible but crystalline plastic, a cardboard sheet, a thin aluminum plate, a flexible metal plate, a rubberized plate or a 2 millimeter thin plate of another flexible but shape supporting synthetic material.

In embodiments, the power source can be a AAA DC battery, a AA battery, a lithium ion battery, a solar cell, a watch battery, a hearing aid battery, or any other commercially available battery. In embodiments, the power source can be rechargeable. In embodiments, the power source can be replaceable.

In embodiments, the power source can be a printable battery, such as one from the Fraunhofer Research Institution for Electronic Nano Systems ENAS, of Germany. This embodiment is environmentally friendly, as the printable battery contains little to no mercury. The apparatus can include a substrate that can operate as a wrist band, a neck band, head gear, a neck lanyard, a brooch, a T-shirt, sunglasses, or another wearable apparatus with a lighting effect.

In embodiments, the apparatus can have a "no reentry" code, which can prohibit reentry of the apparatus to the venue.

In order to more fully understand the apparatus, an embodiment of a method of using the apparatus can include the steps of:

(a) gaining access to a controlled access venue using an apparatus with a substrate, with an actuator embedded within the substrate, wherein the actuator is connected to a power source embedded in the substrate, at least one light embedded in the substrate, a controller with a processor embedded in the substrate, data storage communicating with the processor embedded in the substrate, computer instructions in the data storage for instructing the processor to operate at least one light;

(b) actuating at least one light on the apparatus comprising a step selected from the group consisting of: pulling on a pull tab, receiving a first signal from a performance transmitter, tearing off a tear tab disposed on the substrate, wherein a pull tab is disposed on the tear tab, engaging a switch embedded in the substrate, receiving a second signal from a network transmitter connected to a network, actuating a switch disposed on the substrate, receiving a first signal from a performance venue, or various combinations thereof; and (c) receiving a second signal from a network to synchronously operate each of the at least one lights to create a synchronous lighting effect with each processor of each apparatus in an audience, while controlling access to the venue, allowing each member of the audience to interactively participate with a performance.

As is readily apparent, each apparatus of a plurality of apparatuses can be coordinated with others to create a desired lighting effect. While the above embodiments discuss a desired lighting effect to enhance a performance or event at the venue, various safety features can be implemented to help safeguard the attendee at the event and the venue.

One method of using the present apparatus can include directing attendees to less crowded areas of the venue. Especially at times of entrance and exit, certain areas of the venue may become unduly crowded. The desired lighting effect can be used to help alleviate these situations.

For example, attendees may have multiple color lights on the apparatus they are wearing. By color coding, or flashing lights for less crowded areas, or entrances and exits, attendees can be induced to utilize alternate routes to alleviate crowding.

In embodiments, various sensors can collect and/or monitor biological data from the attendee. Various sensors are known and available to persons having ordinary skill in the art.

Exemplary biological data to monitor can include, but is not limited to: temperature, blood pressure, pulse, blood oxygen content, blood alcohol content, other biological data, or combinations thereof.

When readings from a biological sensor are outside of a safe range for the attendee, thereby determining that the attendee is in distress, the apparatus and surrounding apparatus can coordinate to create a desired lighting effect that identifies the attendee in distress.

In embodiments, the apparatus and surrounding apparatus can coordinate to create a desired lighting effect that leads a responding person to the attendee in distress. Various lighting effects as desired or appropriate to the specific controlled access venue can be implemented for this purpose.

Turning now to the Figures, FIG. 1A shows a controlled access venue 11 with a plurality of apparatus, 5a, 5b, 5c, 5d. Each apparatus can be held by an attendee or a member of the audience 6a, 6b, 6c, 6d. The performance 9 can occur on a stage in front of the audience or can be viewable by the audience. The performance can be remote, or can be electronically connected to the audience in the manner of live aid concerts, which can have remote audiences to the show going on in London.

Also shown in FIG. 1A is a performance transmitter 23 for transmitting a first signal 26.

Figure 1B:
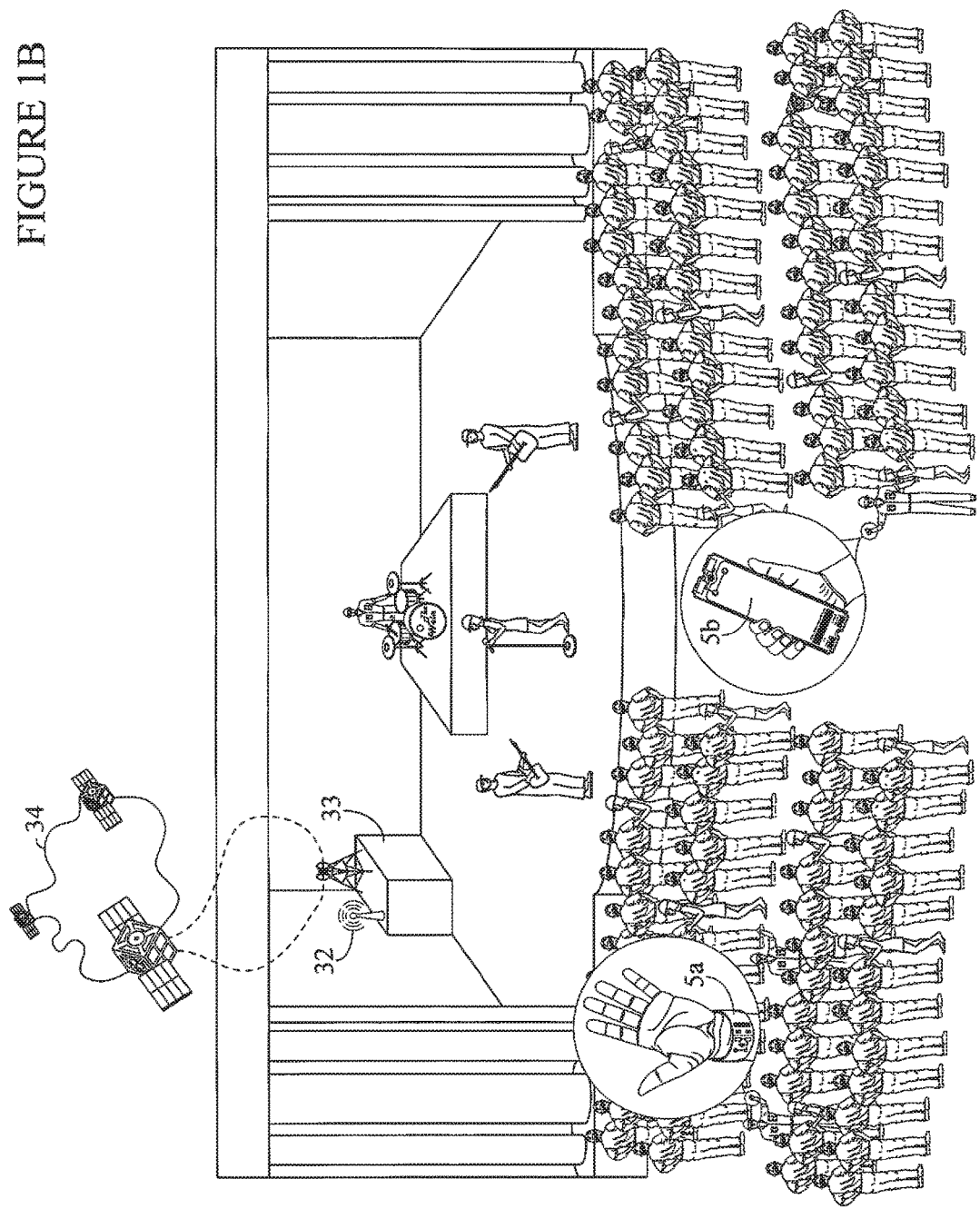
FIG. 1B shows an alternative embodiment of a diagram of a venue with the apparatus for the lighting effect contained in it.

FIG. 1B shows an alternative embodiment of FIG. 1A, with a network 34 in communication with a network transmitter 33 for transmitting a second signal 32 to 5 the plurality of apparatus 5a, 5b, 5c, 5d.

FIG. 2 shows a front view of an apparatus 5a. The apparatus can have a substrate 13, which can be flexible and can be made of a plastic. The plastic can be clear and transparent. The plastic can also be a crystalline polypropylene or homopolymer of polyethylene that can withstand temperatures up to about 112 Fahrenheit without 10 deforming or melting.

The substrate 13 can have a first side 14, which can have a non-removable readable identification code 15. The identification code can be intended to not only be readable by a scanner, such as a bar code, but can be readable or scanned by a human.

In the substrate 13 can have a power source 16, which can be battery. Also, in the first side 14 can be a first light 18a and a second light 18b, which can be the same color, different colors, or multicolored. The lights can be connected to the power source 16.

A controller 19 can also be connected to at least one light 18a, 18b, which can be connected in series, in parallel, or combinations thereof. The controller 19 can be in communication with the power source 16.

FIG. 2 also shows the sound receiver 27 which is depicted connected to the power supply 16 and the controller 19. The sound receiver 27 can be a wireless signal receiver, or an infrared detector, which the first signal can be transmitted to via the network. In embodiments, the sound receiver 27 can also comprise a sensor to read biological data from the attendee when the sound receiver 27 is in contact with the attendee.

The apparatus is shown with a switch 35 for actuating the lighting effect using the lights. The apparatus can also have an expiration date 45 and a no reentry code 50.

FIG. 3 shows the opposite side of the apparatus 5a of FIG. 2 with the second side 17 supporting a message 12. This Figure also shows the pull tab 29, which is disposed as a block between the controller 19 and the power source 16. In this embodiment, once the pull tab is pulled or torn, it will remove the block from the power source to the controller and initiate the lighting effect.

Figure 4:
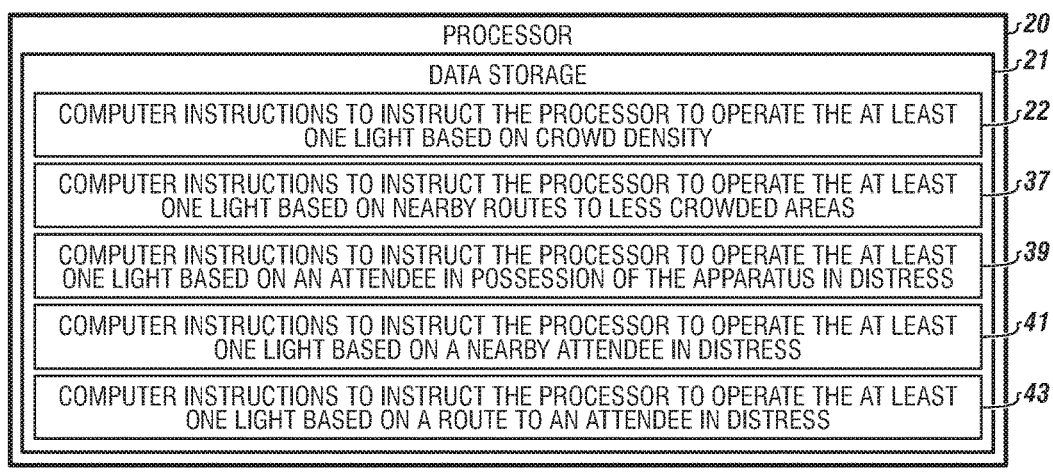
FIG. 4 is a diagram of the processor with computer instructions in data storage according to one or more embodiments.

FIG. 4 shows a processor 20 with data storage 2, which can include computer instructions to instruct the processor to operate the at least one light based upon: crowd density 22, nearby routes to less crowded areas 37, an attendee in possession of the apparatus in distress 39, a nearby attendee in distress 41, or a route to an attendee in distress 43.

The lighting effect can be pulsed, colored, or otherwise altered based upon the desired effect. The lights can be individually preprogrammed lights with flashing sequences. The lights can be operated based on a seat location and can be based on nearby crowd or attendees in distress.

Figure 5:
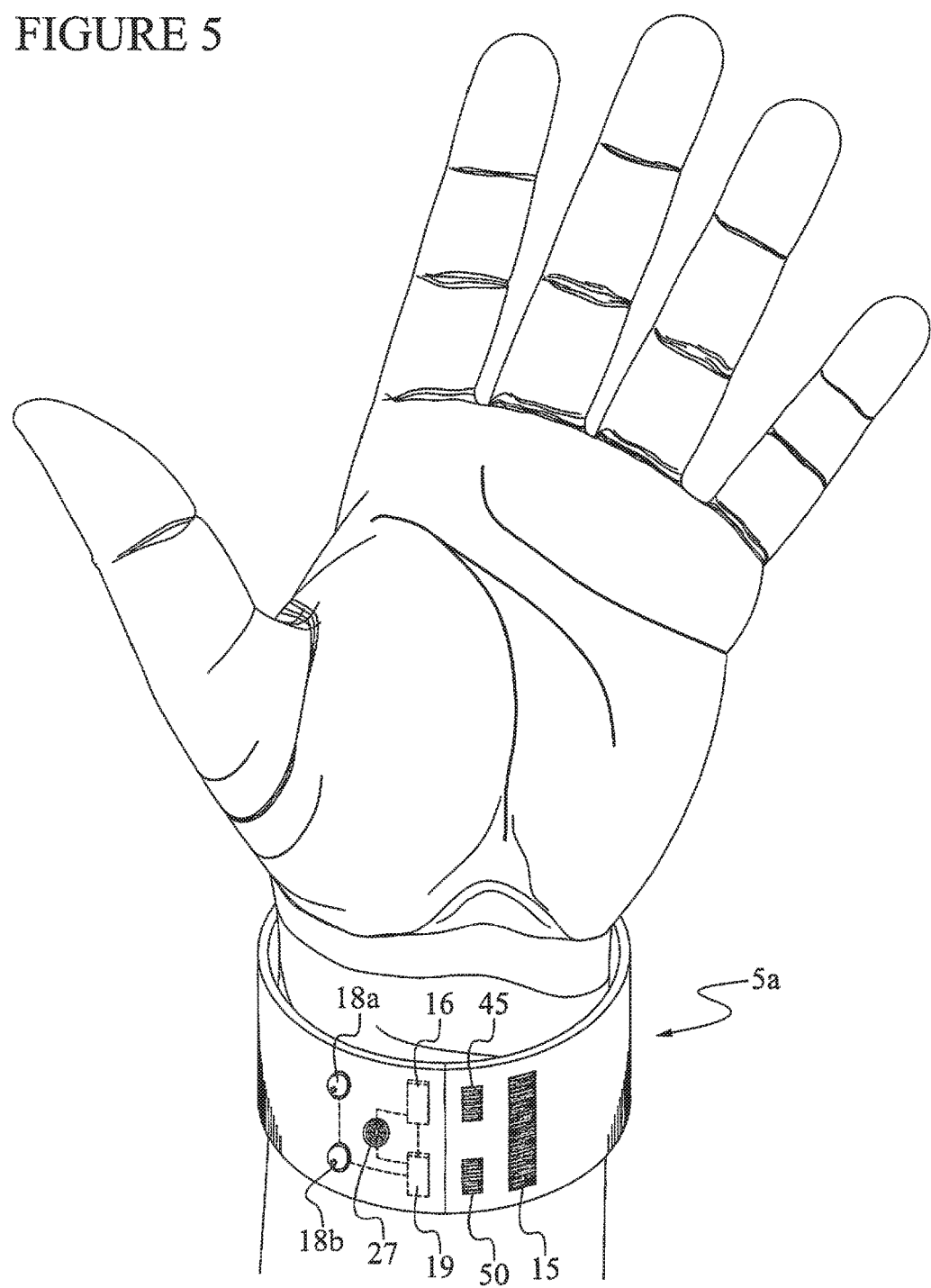
FIG. 5 shows a wristband embodiment of the apparatus.

FIG. 5 shows an embodiment of the apparatus 5a, wherein the apparatus 5a is a wristband. The wristband embodiment of the apparatus 5a is further shown with first light 18a and second light 18b in communication with the controller 19 and the power source 16 as previously described in FIGS. 2 and 3. The wristband can further comprise a sound receiver 27 which can comprise a sensor to monitor biological data of an attendee.

While the present disclosure emphasizes the embodiments, it should be understood that within the scope of the appended claims, the disclosure might be embodied other than as specifically described herein.

What is claimed is:

1. A method for creating a desired lighting effect comprising:
    a. allowing entry to a venue to a plurality of attendees; and
    b. providing an apparatus to each attendee of the plurality of attendees, wherein each apparatus comprises:
        (i) a substrate;
        (ii) a power source connected with the substrate;
        (iii) at least one light emitting device electrically connected to the power source; and (iv) a controller that receives at least one signal emitted during an event, wherein the at least one signal is selected from the group comprising:
(1) a transmitted radio frequency signal;
(2) a transmitted infrared signal;
(3) a sound signal;
(4) an audio signal;
(5) a network transmitter signal; and
(6) a wirelessly transmitted signal;
wherein the controller responds to the at least one signal emitted during the event to actuate the at least one light emitting device; and wherein the apparatus is one of a plurality of apparatus that collectively create a desired lighting effect, making each attendee part of a group light show.

2. The method of claim 1, wherein the desired lighting effect is intended to manage crowds by directing each attendee of the plurality of attendees to a less crowded area.

3. The method of claim 1, wherein the apparatus further comprises a sensor to collect or monitor biological data from the attendee.

4. The method of claim 3, wherein the biological data includes a temperature, a blood pressure, a pulse, a blood oxygen content, or a blood alcohol content.

5. The method of claim 3, wherein biological data is monitored at a predetermined interval.

6. The method of claim 3, wherein the desired lighting effect is intended to identify an attendee in distress and direct a responding person to the attendee in distress.

* * * * *